Patented Feb. 12, 1935

1,990,625

UNITED STATES PATENT OFFICE 1,990,625

PROCESS FOR THE WORKING UP OF CRUDE CELLULOSE ESTER SOLUTIONS

Wilhelm Walter, Cologne-Niehl, Rudolf Hofmann, Dormagen, and Fritz Oschatz, Mannheim, Germany, assignors to I. G. Farbenindustrie Aktiengesellschaft, Frankfort-on-the-Main, Germany No Drawing. Application June 5, 1931, Serial No. 542,458. In Germany June 10, 1930

7 Claims. (Cl. 260—102)

The present invention relates to the working up of crude cellulose fatty acid ester solutions containing, in addition to the organic fatty acids commonly used as solvents in esterification reactions a chlorinated aliphatic hydrocarbon selected from the group consisting of methylene and ethylene chlorides.

In the manufacture of fatty acid esters of cellulose the corresponding free fatty acid is generally used as solvent or diluent. Consequently, after esterification is complete, the reaction product is a solution of the cellulose ester in the respective free fatty acid, from which solution the ester can be isolated by the addition of precipitating liquids. Thus, for example, in the manufacture of cellulose acetate acetic acid is used as a diluent and when the reaction is complete, the cellulose acetate is, as a rule, separated by precipitation, for example, with water, the acetic acid being recovered in the diluted form.

In British Patent No. 337,366 there is described a process of preparing cellulose fatty acid esters in which, instead of the free fatty acid, the said chlorinated aliphatic hydrocarbons insoluble in water and liquid at room temperature play the part of the diluent in the said esterification process. This process yields as the reaction product crude solutions, containing besides the chlorinated hydrocarbons (which form the principal constituents of the solvent mixture), principally only that relatively small quantity of free fatty acid which has been formed in the course of esterification from the fatty acid anhydride employed.

The isolation of the cellulose ester from such crude solutions cannot be carried out by the hitherto customary methods with due regard to an economical recovery of the solvent. When water is added to a crude cellulose ester solution containing as the principal solvent one of the said chlorinated aliphatic hydrocarbons, no precipitation of the cellulose ester in a useful sense occurs. It is indeed possible by appropriate thorough mixing to dissolve part of the fatty acid, the chlorinated aliphatic hydrocarbon, however, remains occluded in the cellulose ester owing to its insolubility in water and forms a tough mass with the cellulose ester.

Even in the case when the solvents used for carrying out the esterification reaction possess a relatively low boiling point, for example, below that of the free fatty acid, a working up of the crude solution, for example, by first driving off the solvent is still impracticable. Indeed, when the chlorinated aliphatic hydrocarbon is distilled off from the crude solution after esterification is complete, the solution becomes continually thicker. When the removal of the solvent is still far from complete, a solid mass is produced, which can no longer be stirred and which, even when reduced pressure is applied, no longer gives up the solvent. The quantity of fatty acid contained in the crude solution is just too small to keep the cellulose ester in solution. Consequently it is impossible to effect a complete recovery of the chlorinated aliphatic hydrocarbon or to obtain the cellulose ester in a technically useful precipitated form. Moreover, by such treatment—long continued heating in the presence of a highly concentrated fatty acid—the cellulose ester would suffer damage in its physical and chemical properties.

The subject of the present invention is a process which renders it possible to recover quickly and in nearly theoretical yields the chlorinated aliphatic hydrocarbons present in said crude cellulose fatty acid ester solutions and to separate the cellulose ester chemically unchanged and in a technically useful precipitated form, the fatty acid formed during the esterification reaction being separated in the customary manner and recovered.

In accordance with this invention, when crude cellulose fatty acid ester solutions containing as principal solvents, one of the aforesaid chlorinated aliphatic hydrocarbons are subjected to a preliminary precipitation with definite quantities of water, if desired after neutralization of the esterification catalysts present in the solution, and the mixtures thus obtained are heated to such a temperature that distillation begins, the chlorinated aliphatic hydrocarbons are given off with surprising readiness and speed. The water added causes the solvent to be driven off azeotropically, the corresponding vapor mixture passing over at a temperature lying below the boiling points of the individual components. In this manner a complete recovery of the chlorinated aliphatic hydrocarbon present in the crude solvent can be achieved.

It has also been found that the crude solution subjected to preliminary precipitation gradually passes in the course of the distillation into a clear viscous solution. After driving off completely the chlorinated aliphatic hydrocarbon there remains a solution of the cellulose ester in dilute fatty acid, which is clear at the distillation temperature. The relatively small quantity of dilute fatty acid suffices in this manner of working to keep the cellulose ester in solution at elevated temperature with the result that it is possible to precipitate the cellulose ester in a normal manner from the solution thus obtained which is free from the chlorinated aliphatic hydrocarbon.

It is advantageous to adjust the quantity of water added in the preliminary precipitation in such a manner that after the distillation there remains in the solution a fatty acid of from 40-70%, on an average of about 50% strength. Acids in this concentration are capable of keeping the cellulose ester in solution at the distillation temperature with the result that, when the chlorinated aliphatic hydrocarbon has been completely driven off, the cellulose ester can be precipitated, for example, by the addition of water. The dilute fatty acid obtained in the precipitation is worked up in a known manner, for example, by concentration in accordance with any known method.

The cellulose ester subjected to this process is not injured in its chemical and physical properties, since the driving off of the solvent occurs comparatively quickly and since the relatively low concentration of the fatty acid present in the solution cannot lead to a degradation of the cellulose ester.

The invention is illustrated by the following examples, without being limited thereto:

*Example 1.*—To a crude acetylation solution of the composition:

150 kgs. of cellulose acetate containing 55% $CH_3COOH$
250 kgs. of glacial acetic acid
45 kgs. of water
400 kgs. of ethylene chloride a slight excess of sodium acetate is added in order to neutralize the catalyst present in the crude solution. 250 kgs. of water are then added and the reaction mass is heated to about 85° C. with stirring. In the course of one hour an azeotropic mixture of ethylene chloride, water and small quantities of acetic acid distils over; the distillation temperature amounts to about 80° C. When the volatile solvent has been completely driven off, there remains a clear solution of cellulose acetate in 50 to 55% acetic acid from which the cellulose acetate can be precipitated by the addition of water. The ethylene chloride which is separated from water carried over with it is recovered in a yield of 95 to 98% of the theoretical. It is then purified advantageously by distillation and returned to the manufacturing process.

*Example 2.*—A crude solution of the composition:

170 kgs. of cellulose acetobutyrate
250 kgs. of glacial acetic acid
50 kgs. of butyric acid
45 kgs. of water
400 kgs. of methylene chloride is, after neutralization of the catalyst with sodium acetate, subjected to a preliminary precipitation by the addition of 300 kgs. of water. The mass is then heated with stirring whereupon an azeotropic mixture of methylene chloride and water distils over in the course of 30–45 minutes at a temperature of about 40° C. To the clear solution of the acetobutyrate in a from 55 to 60% acetic and butyric acid mixture remaining after the volatile solvent has been driven off, water is added whereupon the mixed cellulose ester separates. The recovered methylene chloride is worked up as in Example 1.

We claim:

1. The process for the separation and recovery of neutral solvent and cellulose ester from a crude cellulose ester solution obtained from a cellulose esterification process and comprising a cellulose fatty acid ester, a chlorinated aliphatic hydrocarbon selected from the group consisting of methylene- and ethylene chlorides, and fatty acid, which process comprises adding such a quantity of water to said crude solution that, after distilling off an azeotropic mixture of water and the chlorinated aliphatic hydrocarbon there remains in the solution a fatty acid of from about 40% to about 70% strength, and distilling off said chlorinated hydrocarbon in azeotropic mixture with water at a temperature below the boiling point of said chlorinated hydrocarbon at atmospheric pressure.

2. The process for the separation and recovery of neutral solvent and cellulose ester from a crude cellulose ester solution obtained from a cellulose esterification process and comprising a cellulose fatty acid ester, a chlorinated aliphatic hydrocarbon selected from the group consisting of methylene- and ethylene chlorides, fatty acid and an esterification catalyst, which process comprises neutralizing said esterification catalyst, adding such a quantity of water to said crude solution that, after distilling off an azeotropic mixture of water and the chlorinated aliphatic hydrocarbon there remains in the solution a fatty acid of from about 40% to about 70% strength, and distilling off said chlorinated hydrocarbon in azeotropic mixture with water at a temperature below the boiling point of said chlorinated hydrocarbon at atmospheric pressure.

3. The process as claimed in claim 1, in which the cellulose ester is precipitated from the residual solution of cellulose ester in aqueous fatty acid by the addition of a precipitant.

4. The process as claimed in claim 2, in which the cellulose ester is precipitated from the residual solution of cellulose ester in aqueous fatty acid by the addition of a precipitant.

5. The process for the separation and recovery of neutral solvent and cellulose acetate from a crude cellulose acetate solution obtained from a cellulose esterification process and comprising cellulose acetate, a chlorinated aliphatic hydrocarbon selected from the group consisting of methylene- and ethylene chlorides, and acetic acid, which process comprises adding such a quantity of water to said crude solution that, after distilling off an azeotropic mixture of water and the chlorinated aliphatic hydrocarbon there remains in the solution an acetic acid of from about 40% to about 70% strength, and distilling off said chlorinated hydrocarbon in azeotropic mixture with water at a temperature below the boiling point of said chlorinated hydrocarbon at atmospheric pressure.

6. The process for the separation and recovery of neutral solvent and cellulose acetate from a crude cellulose acetate solution obtained from a cellulose esterification process and comprising cellulose acetate, ethylene chloride, acetic acid and an acid esterification catalyst, which process comprises neutralizing said acid esterification catalyst, adding such a quantity of water to said crude solution that, after distilling off an azeotropic mixture of water and ethylene chloride there remains in the solution an acetic acid of from about 40% to about 70% strength, and distilling off said ethylene chloride in azeotropic mixture with water at a temperature below the boiling point of said ethylene chloride at atmospheric pressure.

7. The process as claimed in claim 6, in which the acid esterification catalyst is neutralized by means of sodium acetate, and wherein the residual cellulose acetate solution in aqueous acetic acid is precipitated by the addition of water.

WILHELM WALTER.
RUDOLF HOFMANN.
FRITZ OSCHATZ.